(12) United States Patent
Hashimoto et al.

(10) Patent No.: US 7,603,566 B2
(45) Date of Patent: Oct. 13, 2009

(54) AUTHENTICATED PROCESS SWITCHING ON A MICROPROCESSOR

(75) Inventors: Mikio Hashimoto, Kanagawa (JP); Hiroyoshi Haruki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 806 days.

(21) Appl. No.: 10/913,537

(22) Filed: Aug. 9, 2004

(65) Prior Publication Data
US 2005/0144438 A1    Jun. 30, 2005

(30) Foreign Application Priority Data
Dec. 26, 2003   (JP)   ............................. 2003-435287

(51) Int. Cl.
*G06F 9/38* (2006.01)
*H04L 9/32* (2006.01)
*G06F 21/22* (2006.01)
*G06F 9/445* (2006.01)
*G06F 15/177* (2006.01)

(52) U.S. Cl. ........................ 713/187; 713/2; 713/168; 726/30; 712/43; 712/228; 712/229; 718/102; 718/108

(58) Field of Classification Search ............ 713/2, 713/168, 187; 726/30; 712/43, 228, 229; 718/102, 108
See application file for complete search history.

(56) References Cited

U.S. PATENT DOCUMENTS

| 7,155,743 | B2 * | 12/2006 | Goodman et al. .......... 726/25 |
| 7,168,065 | B1 * | 1/2007 | Naccache et al. .......... 717/127 |
| 7,320,129 | B2 * | 1/2008 | Talwar et al. .......... 718/1 |
| 2001/0014157 | A1 | 8/2001 | Hashimoto et al. |
| 2001/0018736 | A1 | 8/2001 | Hashimoto et al. |
| 2002/0051536 | A1 | 5/2002 | Shirakawa et al. |
| 2002/0053024 | A1 | 5/2002 | Hashimoto et al. |
| 2002/0101995 | A1 | 8/2002 | Hashimoto et al. |
| 2003/0033537 | A1 | 2/2003 | Fujimoto et al. |
| 2003/0065933 | A1 | 4/2003 | Hashimoto et al. |
| 2003/0126458 | A1 | 7/2003 | Teramoto et al. |
| 2003/0182571 | A1 | 9/2003 | Hashimoto et al. |

(Continued)

FOREIGN PATENT DOCUMENTS

JP    2000-66586    3/2000

(Continued)

OTHER PUBLICATIONS

Lie, David et al. "Implementing an Untrusted Operating System on Trusted Hardware", Oct. 2003.*

(Continued)

*Primary Examiner*—Michael J Simitoski
(74) *Attorney, Agent, or Firm*—Oblon, Spivak, McClelland, Maier & Neustadt, P.C.

(57) ABSTRACT

A microprocessor includes a first information holding unit, a second information holding unit, and a switching authorization unit. The first information holding unit holds process identification information and authentication information which are associated with each other. The second information holding unit denies access from outside, and holds entry information of a process and the authentication information which are associated with each other. The switching authorization unit allows switching process when the authentication information held in the first information holding unit with the authentication information held in the second information holding unit match.

19 Claims, 14 Drawing Sheets

U.S. PATENT DOCUMENTS

| | | |
|---|---|---|
| 2004/0030911 A1 | 2/2004 | Isozaki et al. |
| 2004/0139341 A1 | 7/2004 | Yamaguchi et al. |
| 2004/0143748 A1 | 7/2004 | Yamaguchi et al. |
| 2005/0144438 A1 | 6/2005 | Hashimoto et al. |

FOREIGN PATENT DOCUMENTS

| | | |
|---|---|---|
| JP | 2002-041168 | 2/2002 |
| JP | 2002-232417 | 8/2002 |
| JP | 2003-108442 | 4/2003 |

OTHER PUBLICATIONS

Suh, G. Edward et al. "Hardware Mechanisms for Memory Integrity Checking", Nov. 2002.*

Suh, G. Edward et al. "AEGIS: Architecture for Tamper-Evident and Tamper-Resistant Processing", Jun. 2003.*

Yang, Jun et al. "Fast Secure Processor for Inhibiting Software Piracy and Tampering", 2003 IEEE.*

U.S. Appl. No. 10/913,537, filed Aug. 9, 2004, Hashimoto et al.

U.S. Appl. No. 11/060,704, filed Feb. 18, 2005, Haruki et al.

D. L. C. Thekkath, et al., Computer Architecture News Archive, No. 28(5), pp. 168-177, "Architectural Support for Copy and Tamper Resistant Software", 2000.

G. Edward Suh, et al. "Efficient Memory Integrity Verification and Encryption for Secure Processors", Laboratory for Computer Science Massachusetts Institute of Technology Cambridge, MA 02139, Jun. 2003, 13 pages.

U.S. Appl. No. 12/274,024, filed Nov. 19, 2008, Hashimoto, et al.

* cited by examiner

FIG.6

162 SHARED KEY TABLE

| ECU ID | PROGRAM KEY (Kxn) | PROGRAM LENGTH (Lxn) | DISTRIBUTION KEY VERIFIER (Hxn) | DATA KEY (Kdn) | ⋮ |
|---|---|---|---|---|---|
| U0 | Kx0 | Lx0 | Hx0 | Kd0 | ⋮ |
| U1 | Kx1 | Kx1 | Hx1 | Kd1 | ⋮ |
| ⋯ | ⋯ | ⋯ | ⋯ | ⋯ | ⋮ |

GENERAL REGISTER(Rx) 121

DATA ENCRYPTION ATTRIBUTE REGISTER(Ex) 122

CALLER HOLDING REGISTER 123

CALLEE DESIGNATION REGISTER 124

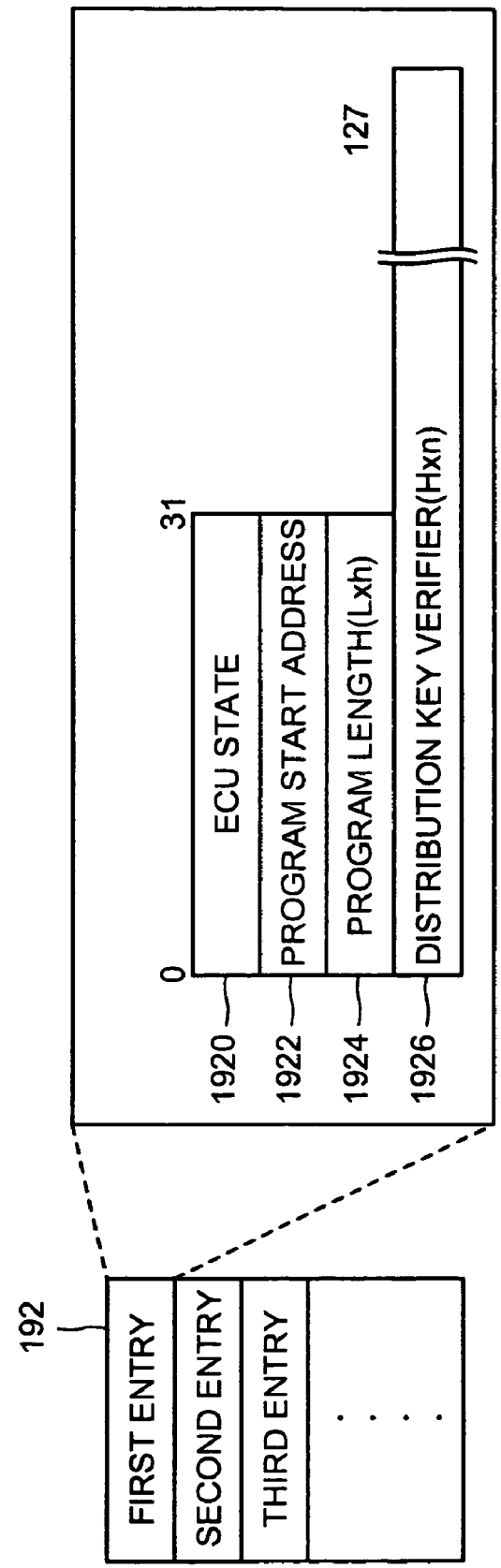

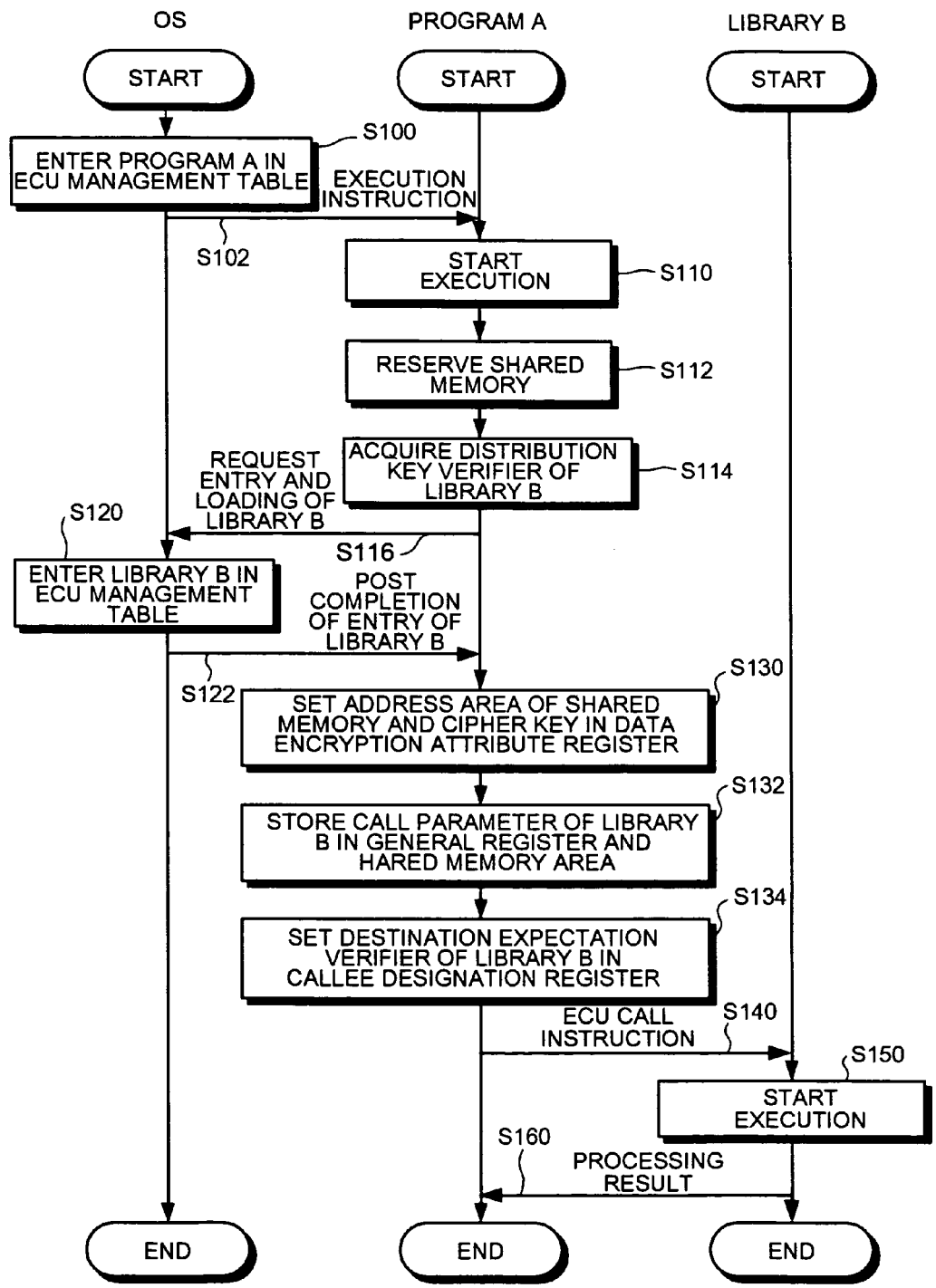

AUTHENTICATED PROCESS SWITCHING ON A MICROPROCESSOR

CROSS-REFERENCE TO RELATED APPLICATIONS

This application is based upon and claims the benefit of priority from the prior Japanese Patent Application No. 2003-435287 filed on Dec. 26, 2003 the entire contents of which are incorporated herein by reference.

BACKGROUND OF THE INVENTION

1) Field of the Invention

The present invention relates to a microprocessor that executes a program.

2) Description of the Related Art

In recent years, the open system of computers, in which source codes of hardware and operating system (OS) of a personal computer (PC) for general users are disclosed, has come into wide use. The end users are allowed to modify or improve the operating program, thereby obtaining their desired programs.

On the other hand, it is necessary to protect the copyright of information handled by an application program and the copyright of the program itself. To this end, a mechanism for security protection of programs, that is, a mechanism for protection against tampering with programs is required. It is assumed that an attack on application programs would be made by tampering with the OS program. By mere modification to the OS to guard against the attack on the application programs, it is difficult, therefore, to protect computers from intrusion by third parties. A solution to this problem requires hardware that provides program security protection. The reason for this is that modification to hardware is extremely difficult to end users as compared with the OS modification.

As hardware that satisfies such requirement, especially a microprocessor of this kind, there has already been proposed a tamper-resistant processor (see Japanese Patent Application Laid-open No. 2003-108442 and Lee et. al, "Architectural Support for Copy and Tamper Resistant Software", Computer Architecture News, 28(5), p. 168). Such a processor has a function of encrypting a program and information used in the program in a multi-task environment so as to prevent third parties from obtaining the program and information, and from tampering with the program.

In an environment where the OS is not reliable, however, it is impossible only with the tamperproof processor to prevent a malicious third party from tampering with the OS program to attack the application program.

SUMMARY OF THE INVENTION

It is an object of the present invention to at least solve the problems in the conventional technology.

A microprocessor which executes a program including a plurality of processes, according to one aspect of the present invention, includes a first information acquiring unit, a first information holding unit, a second information acquiring unit, a second information holding unit, and a switching authorization unit. The first information acquiring unit acquires, from outside, process identification information for identifying a second process to be executed after a first process and authentication information for authenticating the second process. The first information holding unit holds the process identification information and the authentication information so that the process identification information and the authentication information are associated with each other. The second information acquiring unit acquires the authentication information and entry information for identifying an entry of the second process in the first information holding unit from the first information acquiring unit when the first process is executed. The second information holding unit denies access from outside, and holds the entry information and the authentication information so that the entry identification information and the authentication information are associated with each other. The switching authorization unit compares, upon issuance of an instruction for switching from the first process to the second process, the authentication information held in the first information holding unit with the authentication information held in the second information holding unit, and allows, when the two authentication information match, switching from the first process to the second process.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a functional block diagram of a first software vendor 500a;

FIG. 6 is a schematic representation of the data structure of a shared key table 162;

FIG. 9 schematically depicts the data structure of an ECU management table;

FIG. 10 is an explanatory diagram of the authentication processing when a program A calls a library B;

DETAILED DESCRIPTION

Exemplary embodiments of a microprocessor according to the present invention will be described in detail with reference to the accompanying drawings. However, the present invention is not limited by the embodiments.

Figure 1:
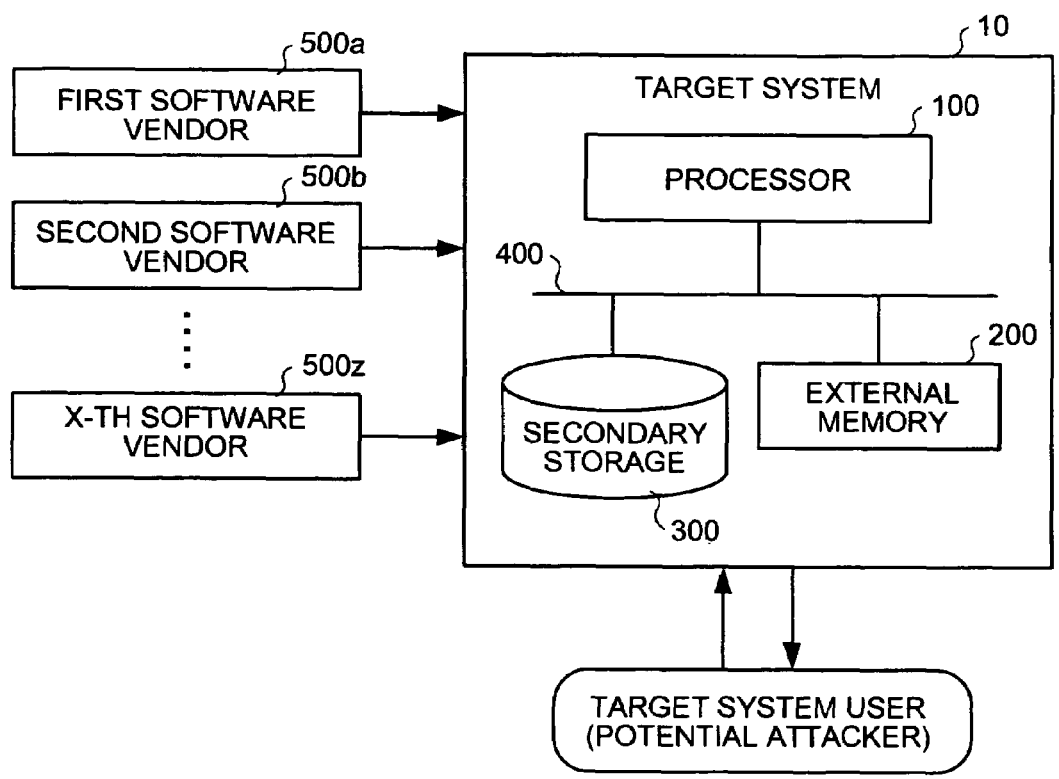
FIG. 1 is a schematic diagram of the general outline of a target system according to an embodiment.

FIG. 1 is a schematic diagram of a target system according to an embodiment. A target system 10 includes a processor 100, an external memory 200, a secondary storage 300 such as a hard disk (HDD), and a system bus 400 interconnecting them. Through their cooperation the target system 10 obtains encrypted programs from each of software vendors 500a, 500b, . . . , 500z, and then decrypts the programs obtained for execution.

The target system 10 denies an attack by a target system user. The target user mentioned herein is a malicious user who makes an attack on the target system 10, such as tampering with its program. A description will be given below of how to resist the attack by the system user on the target system 10.

Figure 2:
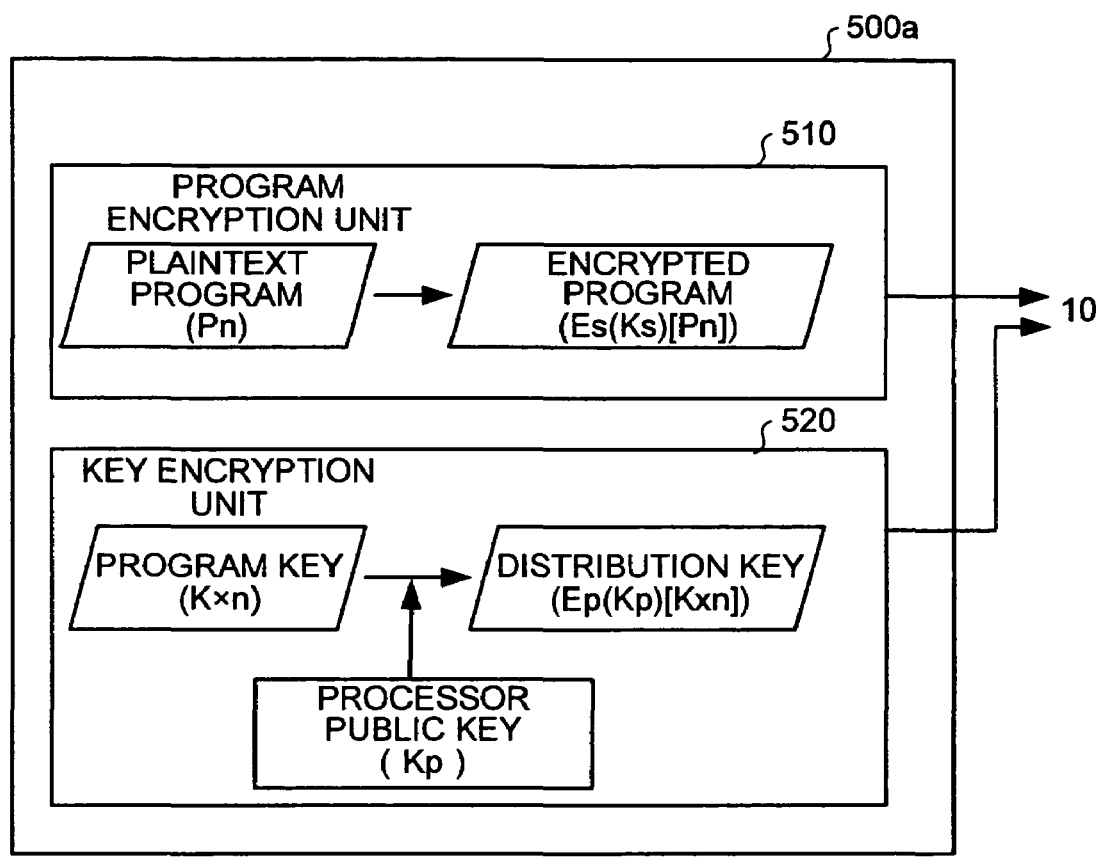

FIG. 2 is a functional block diagram of the first software vendor 500a, which has a program encrypting unit 510 and a key encrypting unit 520.

The program encrypting unit 510 selects a program key (Kxn) (n=1, 2, . . . ) for protecting a plaintext program (Pn) (n=1, 2, . . . ), and encrypts the selected program key by a predetermined shared key encryption algorithm to create an encrypted program (Es(Ks)[Pn]). The plaintext program mentioned herein is a program sent to the target system 10 for execution at the target system 10.

The key encrypting unit 520 encrypts the program key (Kxn) by a public key (Kp) through use of a predetermined algorithm to create a distribution key (Ep(Kp)[Kxn]). The public key (Kp) mentioned herein is a public key unique to the target system 10 which is made public by the target system 10.

The encrypted program (Es(Ks)[Pn]) and the encrypted program key, that is, the distribution key (Ep(Kp)[Kxn]) are both sent to the target system 10. In the following description a combination of the encrypted program (Es(Ks)[Pn]) and the distribution key (Ep(Kp)[Kxn]) will be referred to as a program n.

The second to n-th software vendors 500b to 500n are common in functional configuration to the first software vendor 500a described above in respect of FIG. 2.

Figure 3:
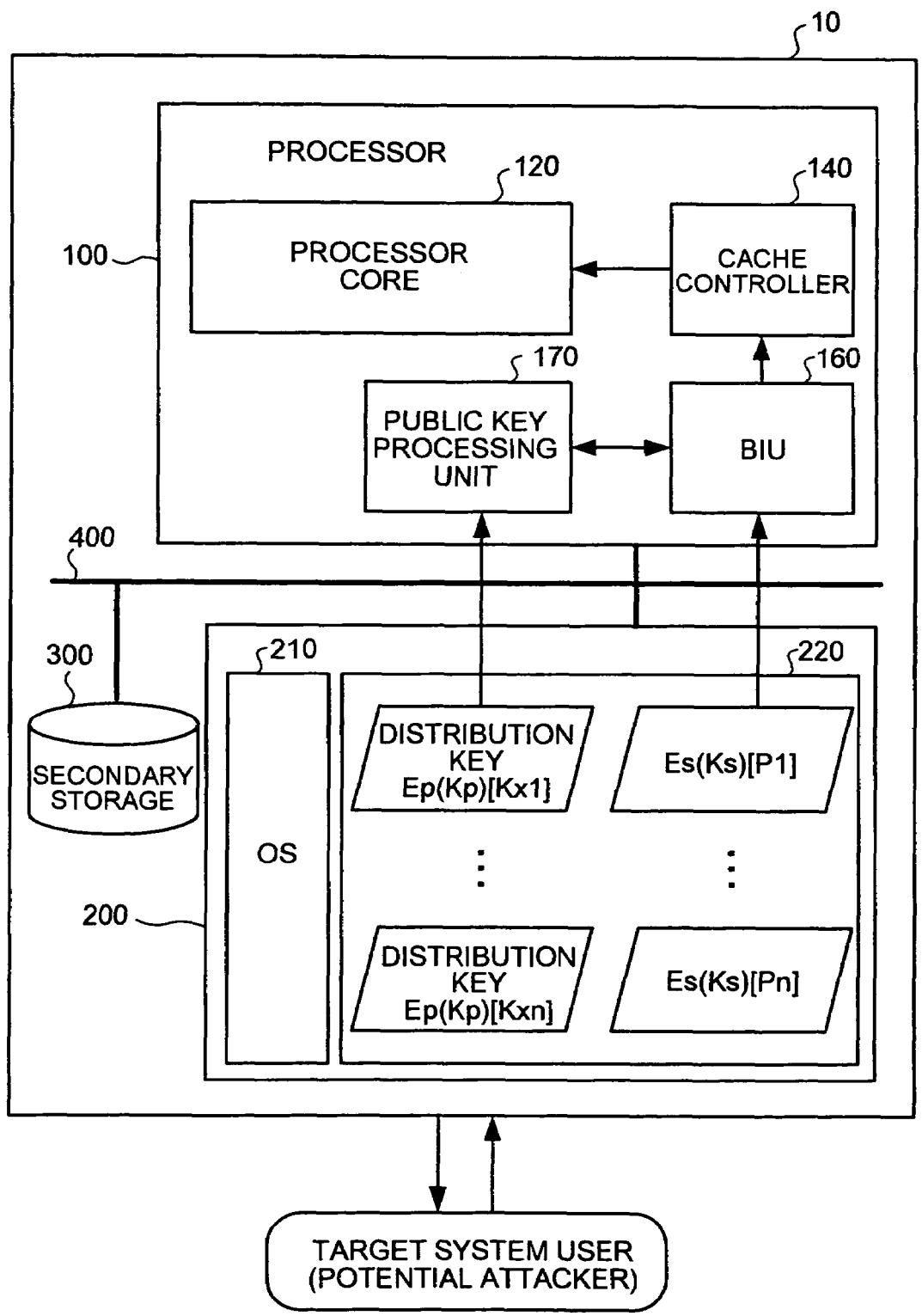
FIG. 3 depicts the detailed configuration of a target system 10.

FIG. 3 depicts the detailed configuration of the target system 10. A processor 100 in the target system 10 includes a processor core 120, a cache controller 140, a bus interface unit (BIU) 160, and a public key processing unit 170.

An external memory 200 includes an OS 210 and a program holding unit 220.

The OS 210 manages the target system 10 its entirety. The OS 210 dynamically reads a plurality of application programs (hereinafter, "programs") into the external memory 200, and manages each program. The program holding unit 220 holds the encrypted program created in each software vendor being a sender, and the distribution key corresponding to each program.

The use of the target system is allowed to freely read out and rewrite the contents of the external memory and a secondary storage 300. These functions present a problem in terms of security protection of the programs. In the multitask environment, however, they are indispensable functions for appropriate allocation and management of system resources to meet users requirements. Accordingly, it is undesirable to limit these functions with a view to defending the programs against attacks by malicious third parties. The processor according to this embodiment functions as what is called a reliable third party for security protection and allocation and management of system resources between the program vendors and the target system user. It is almost impossible for ordinary users to alter a processor mounted as a large scale integrated circuit (LSI) to get secret information or modify the mechanism for security protection, and to counterfeit the processor also requires a high degree of technical expertise.

Therefore, it is a reasonable assumption to make the processor trusty from both of the program vendor and the target system user.

Upon obtaining the distribution key (Ep(Kp)[Kxn]) and the encrypted program (Es(Ks)[Pn]) from the software vendor 500, the target system 10 stores them in the secondary storage 300. Upon program execution, the target system 10 reads the distribution key (Ep(Kp)[Kxn]) and the encrypted program (Es(Ks)[Pn]) into the program holding unit 220.

The public key processing unit 170 uses the processor secret key (Ks) to decrypt the distribution key (Ep(Kp)[Kxn]) to obtain the program key (Kxn). The processor secret key (Ks) is a secret key corresponding to the processor public key (Kp).

The BIU 160 is an I/O interface with external devices. The processor 10 carries on all exchanges of information with the external devices via the BIU 160. The BIU 160 decrypts the encrypted program (Es(Ks)[Pn]) into the plaintext program (Pn) by use of the program key (Kxn) obtained in the public key processing unit 170. During execution of the plaintext program (Pn) by the processor core 120, the cache controller 140 holds the plaintext program (Pn) and the program key (Kxn).

The decryption of the encrypted program (Es(Ks)[Pn]) and the distribution key (Ep(Kp)[Kxn]) contained in the programs requires the program key (Kxn) and the processor secret key (Ks), respectively. Accordingly, when the target system user does not know values of the program key (Kxn) and the processor public key (Kp) even if the programs are held in the external memory 200 or secondary storage 300, there is no fear of the target system user tampering with the programs. That is, the programs are safe. In this embodiment the contents of the program key (Kxn) and the plaintext program (Pn) cannot be read out directly from outside, except by the user's manipulation defined by the specification of the processor core 120.

The plaintext (Pn) decrypted by the BIU 160 is read into a cache memory of the cache controller 140. The decryption and read of the plaintext program (Pn) into the cache memory are performed partially in accordance with the program execution based on a predetermined cache algorithm. That is, the plaintext program (Pn) need not be read in its entirety into the cache memory at one time. The program read into the cache memory is already decrypted. This allows the processor core 120 to execute the program concerned in the same manner as in the case of executing a non-encrypted program.

As described above, the decrypted program key (Kxn) and plaintext program (Pn) are handled only in the processor 100. In other words, there are no instances that the OS 210 handles the decrypted program key (Kxn) and plaintext program (Pn). This enables the OS 210 to prevent penetration by a malice third party who tampers with the program key (Kxn) or plaintext program (Pn).

A description will be made below of the configuration and processing of the processor 100. The processor 100 according to this embodiment is a tamper-resistant processor that safeguards programs of a multivendor in a multitask computer system. The tamper-resistant processor is one that safeguards the multivendor programs by processor hardware. More specifically, the tamper-resistant processor provides program-security function which is completed by the hardware facility of a processor package unit on the assumption that the OS is not reliable.

Tamper-resistant processor hardware directly manages unit of process information conventionally placed under management of the OS. Cipher processing of the program itself is handled by hardware. This is a major difference between tamper-resistant processor hardware and ordinary processor hardware. The tamper-resistant processor is capable of achieving pseudo parallel execution of plural ECUs. The ECU herein mentioned is a process placed under the management of tamper-resistant processor hardware, that is, an execution control unit.

Figure 4:
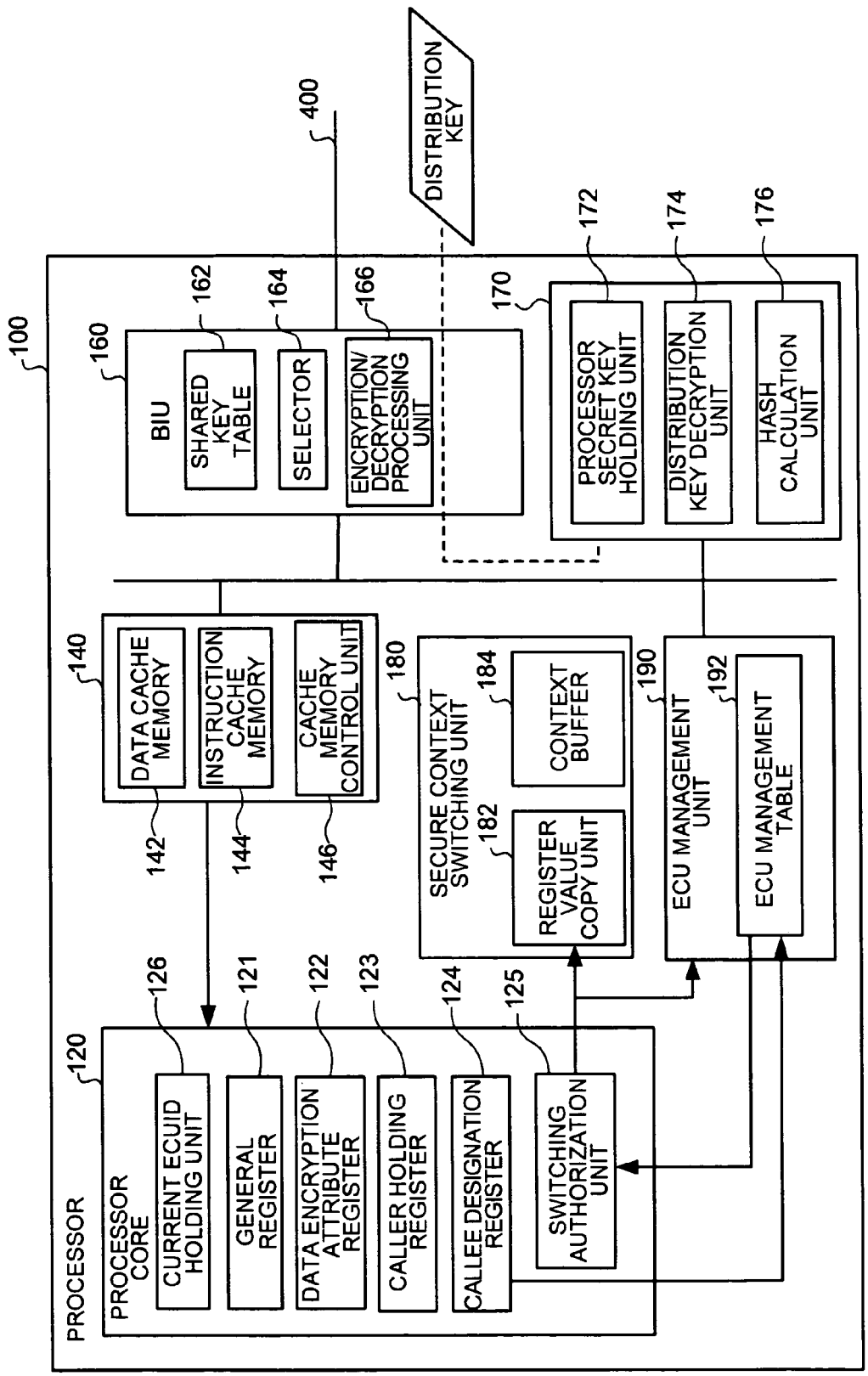
FIG. 4 is a block diagram of the detailed configuration of a processor 100.

FIG. 4 is a block diagram of the detailed configuration of the processor 100. The public key processing unit 170 has a processor secret key holding unit 172, a distribution key decryption unit 174, and a hash calculation unit 176. The distribution key decryption unit 174 uses the processor secret key (Ks) held in the processor secret key holding unit 172 to decrypt the distribution key (Ep(Kp)[Kxn]) received via the system bus 400 to obtain the program key (Kxn). The hash calculation unit 176 processes, by a predetermined algorithm, the distribution key (Ep(Kp)[Kxn]) received via the system bus 400 to generate a distribution key verifier (Hxn). The program key (Kxn) obtained by the distribution key decryption unit 174 and the distribution key verifier (Hxn) by the hash calculation unit 176 are stored on a shared key table 162. In this embodiment the distribution key verifier (Hxn) is used for the program authentication described later on.

Figure 5:
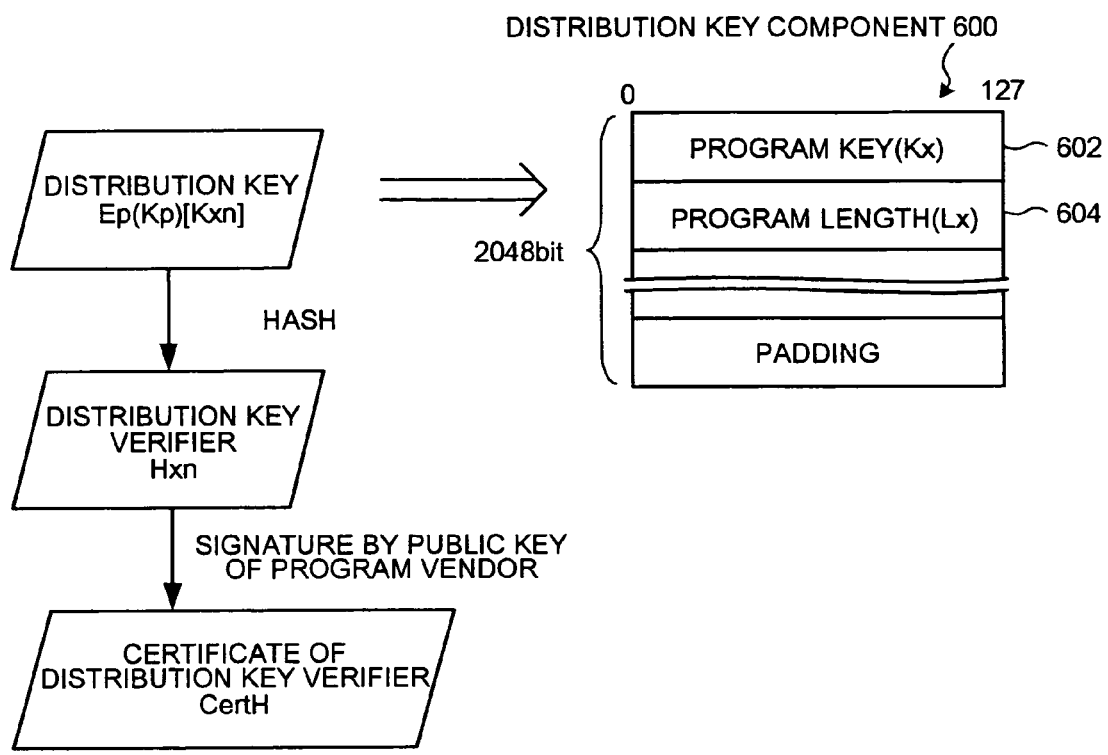
FIG. 5 depicts the relationship between a distribution key (Ep(Kp)[Kxn]) and a distribution key verifier (Hxn)

Referring now to FIG. 5, the relationship between the distribution key (Ep(Kp)[Kxn]) and the distribution key verifier (Hxn) will be described. The distribution key (Ep(Kp)[Kxn]) is data obtained by encrypting distribution key components 600, such as a program key 600 and a program length 604, by use of the processor public key (Kp). The distribution key verifier (Hxn) is a hash value obtained by calculating the distribution key (Ep(Kp)[Kxn]) based on a predetermined algorithm. The predetermined algorithm is, for example, SHA-256.

For example, in the case of using an algorithm RSA2048, the distribution key (Ep(Kp)[Kxn]) is 2048-bit. When SHA-256 is applied in this case, the amount of data of the distribution key verifier (Hxn) is ⅛ that of the distribution key (Ep(Kp)[Kxn]). Thus, the use of the hash value permits reduction of the amount of table and memory capacity needed in the processor.

This embodiment utilizes the distribution key verifier with a view to decreasing the amount of data, but the distribution key itself may be used instead.

As referred to later on, in the processor 100 of the target system 10 the validity of the distribution key verifier is needed in the authentication of a callee program by a caller one. To this end, the distribution key verifier of the callee program is added with a certificate (CertH) by a program vendor as information for confirming the validity of the distribution key verifier. By verifying the certificate, the caller program confirms the validity of the distribution key verifier that authenticates the callee program.

Turning back again to FIG. 4, the BIU 160 includes a shared key table 162, a selector 164, and an encryption/decryption unit 166. The shared key table 162 has a plurality of entry areas, and holds therein shared keys such as program keys for the processes executed by the processor 100. The encryption/decryption unit 166 encrypts or decrypts the process by the shared keys. The selector 164 extracts a predetermined one of the shared keys stored in the shared key table 162.

FIG. 6 is a schematic representation of the data structure of the shared key table 162. The shared key table 162 has m+1 entries U0 to Um, in each of which ECU is stored. The ECU is a process placed under the management of the tamper-resistant processor. The processor 100 executes the ECU as one unit. ECU ID is identification information for uniquely identifying the ECU.

Each entry has a program key field, a program length field, a distribution key verifier field, and a data key field.

In the program key field, there is stored a program key (Kxn) of the corresponding program. In the program length field, there is stored a program length (Lx) of the corresponding program. In the distribution key verifier field, there is stored a distribution key verifier (Hxn) generated from the distribution key corresponding to the program key. In the data key field, there is stored a data key (Kdn). The data key is an encryption key that is used for data encryption and decryption.

The BIU according to this embodiment constitutes a first information acquiring unit and a first information holding unit according to the present invention.

Turning back again to FIG. 4, the cache controller 140 includes a data cache memory 142, an instruction cache memory 144, and a cache memory control unit 146 that controls each memory.

Figure 7:
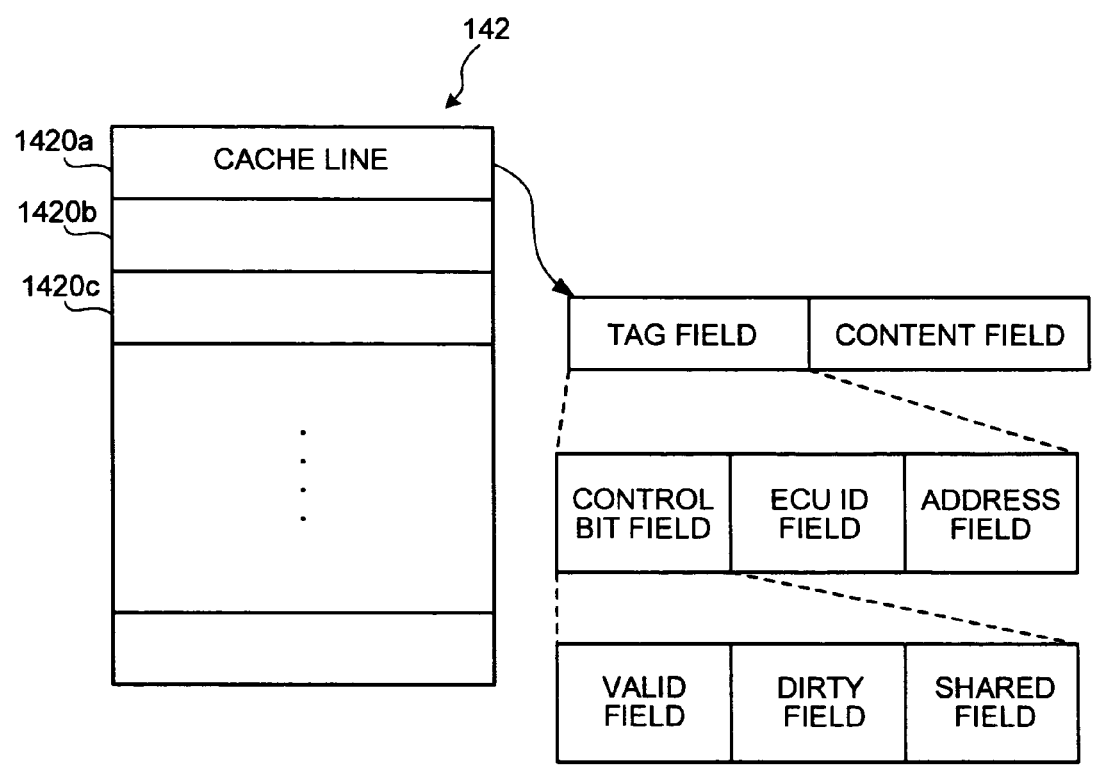
FIG. 7 is a schematic diagram of a memory map of a data cache memory.

FIG. 7 is a schematic diagram of a memory map of the data cache memory 142. The data cache memory 142 has cache lines 1420a to 1420n. Each cache line has a tag field and a data field. The tag field includes a control bit field, an ECU ID field, and an address field. The ECU ID field holds an ECU ID. The address field holds an address of the ECU.

The control bit field includes an valid field, a dirty field, and a share field. The valid field holds information (valid/invalid) that indicates whether each cache line is valid or invalid. When the cache contents are being updated with the contents of the external memory 200, the dirty field holds information (dirty/clean) that indicates whether the external memory 200 is also updated correspondingly. The share field holds information (shared/exclusive) that indicates whether the cache line is shared with another processor.

Figure 8A:
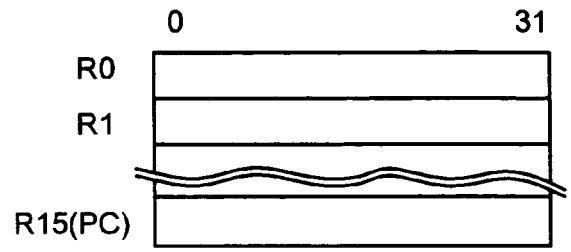
FIG. 8A depicts the data structure of a general register.
Figure 8B:
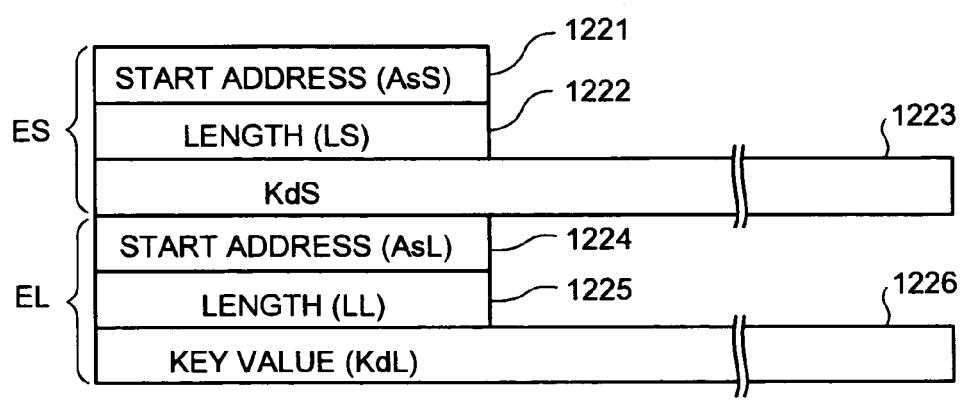
FIG. 8B depicts the data structure of a data encryption attribute register.
Figure 8C:
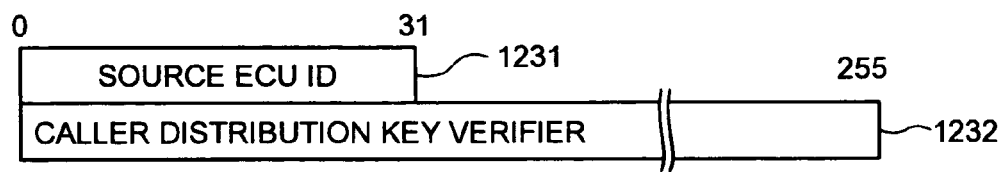
FIG. 8C depicts the data structure of a caller holding register.
Figure 8D:
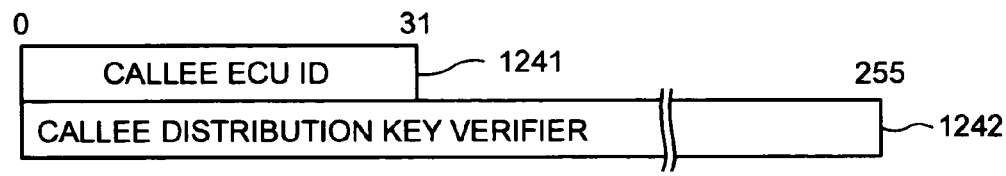
FIG. 8D depicts the data structure of a callee designation register.

Turning back again to FIG. 4, the processor core 120 of the processor 100 includes a general register 121, a data encryption attribute register 122, a caller holding register 123, a callee designation register 124, a switching authorization decision unit 125, and a current ECU ID holding unit 126. FIGS. 8A to 8D schematically depict the data structure of each register. FIG. 8A depicts the data structure of the general register 1221, FIG. 8B depicts the data structure of the data encryption attribute register 122, FIG. 8C depicts the data structure of the caller holding register 123, and FIG. 8D depicts the data structure of the callee designation register 124.

The general register 121 has set therein the ECU ID of the process that is being currently executed in the processor core 120. The data encryption attribute register 122 has set therein a value associated with encryption of the program to be processed. The caller holding register 123 has set therein information on the caller program and so forth.

The callee designation register 124 has set therein information on the callee program, which is called from the caller program or the like. The switching authorization decision unit 125 determines whether to allow the execution between the caller and callee. In the current ECU ID holding unit 126, there is set the ECU ID of the ECU currently under execution.

The processor 100 further includes a secure context switching unit 180. The secure context switching unit 180 has a register value copy unit 182 and a context buffer unit 184. The register value copy unit 182 copies the value of each register of the processor core 120 to the context buffer unit 184. More specifically, when the execution of a program is suspended upon occurrence of an interruption, the register value copy unit 182 saves in the context buffer unit 184 information about each register of the processor core 120 at the time when the program is suspended.

The secure context switching unit according to this embodiment constitutes a save unit and a copy unit in the present invention.

The processor 100 is further provided with an ECU management unit 190. The ECU management unit 190 enters in an ECU management table 192 the ECU ID of the ECU to be executed by the processor core 120. The ECU management table 192 has a plurality of entry areas. FIG. 9 schematically depicts the data structure of the ECU management table 192. Each entry area of the ECU management table 192 has an ECU state field 1920, a program start address field 1922, a program length field 1924, and a verifier field 1926.

In the ECU state field 1920, there is set information indicating the ECU execution state. In the program start address field 1922, there is set a start address of the ECU program. In the program length field 1924, there is set the ECU program length. In the verifier field 1926, there is set a distribution key verifier of the distribution key corresponding to the ECU.

The ECU management unit 190 according to this embodiment constitutes a second information acquiring unit and a second information holding unit of the microprocessor according to the present invention.

A description will be given of authentication processing between software modules in the processor of this embodiment. Referring now to FIG. 10, authentication processing will be described, by way of example, when a program A calls a library B. The program A is one that is executed as a process. The library B shares the entire memory space with the process of the program A. In FIG. 10 the OS, the program A and the library B are shown as being executed in parallel, but it is only one program that the processor core executes at a certain point in time, and the respective programs operates on a pseudo parallel basis. In the following description, switching from a certain program to another will be referred to as a transfer of control.

In the first place, the OS 210 enters the program A in the ECU management table 192 (step S100). More specifically, the OS 210 selects from the shared key table 162 the ECU ID in which to enter the program A, then enters the distribution key and the distribution key verifier of the program A in the selected ECU ID, and issues a distribution key entry instruction, using the selected ECU ID and the distribution key (EP(Kp)(Kxn)) of the program A as parameters. The ECU management unit 190 then selects a free entry in the ECU management table 192, and based on the distribution key entry instruction, enters the programs A in the free entry of the ECU management table 192. That is, the ECU management unit 190 enters the distribution key verifier and the like of the program A in the ECU management table 192. Following this, the OS 120 transfers control to the program A, starting the execution of the program A (step S102).

Figure 11:
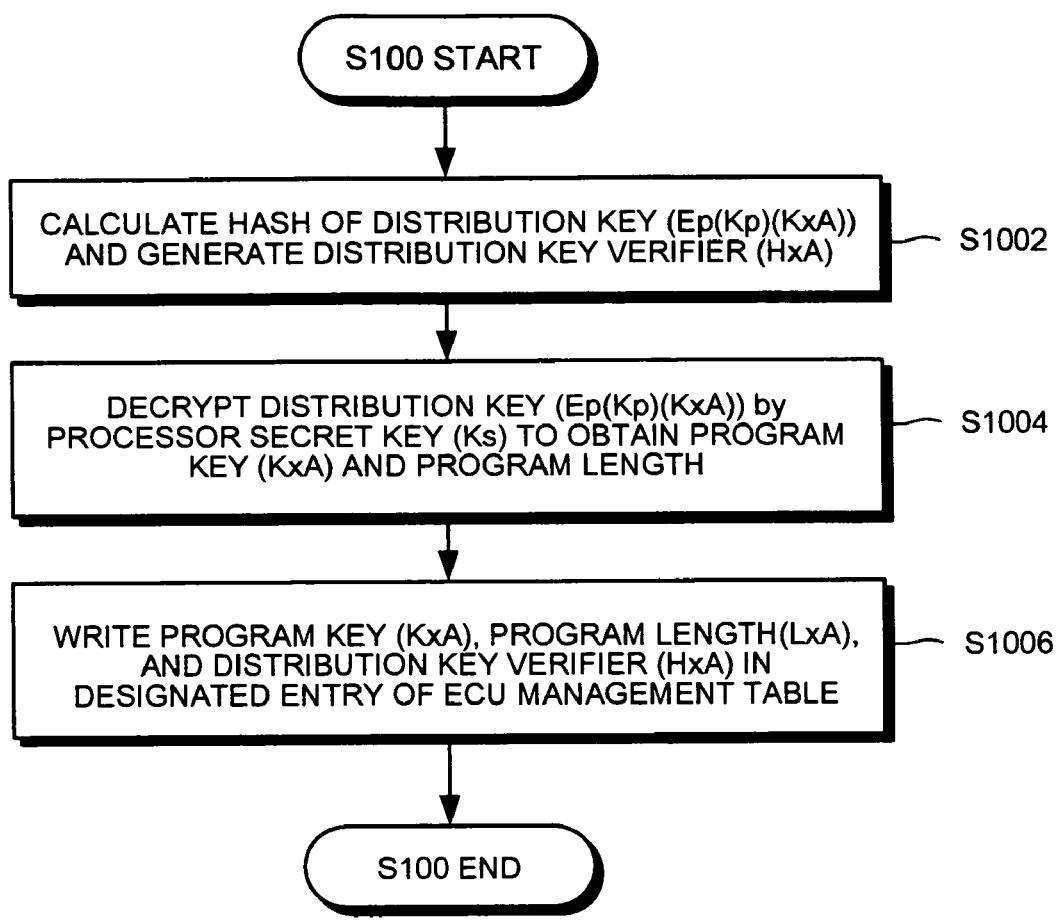
FIG. 11 is a flowchart of the procedure of the distribution key entry performed by a processor, at a step S100 shown in FIG. 10.

A detailed description will be given of the entry processing that the processor 100 performs in response to the instruction from the OS 210. FIG. 11 is a flowchart of the procedure that is followed by the processor 100 for the entry of the distribution key in step S100. Upon issuance of the distribution key entry instruction by the OS 210, the hash calculation unit 176 of the processor 100 calculates the hash value of the distribution key (Ep(Kp)(KxA)) of the program A, that is, the distribution key verifier (HxA) (step S1002). The distribution key decryption unit 174 then decrypts the distribution key (Ep (Kp)(KxA)) by the processor secret key (Ks), and acquires the program key (KxA) and the program length (LxA) (step S1004).

The ECU management unit 190 of the processor 100 writes the acquired program key (KxA) and the distribution key verifier (HxA) to the designated ECU ID entry in the ECU management table 192. The ECU ID is being designated as a parameter of the distribution key entry instruction.

Turning back again to FIG. 10, the execution of the program A is started upon completion of its entry (step S110). The program A then reserves a shared memory area (step S112), and acquires the distribution key verifier of the library B that is the callee (step S114). The acquisition of the distribution key verifier of the library B corresponds to the acquisition of an execution switching instruction according to this embodiment. Further, the program A verifies the validity of the distribution key verifier of the library B based on its certificate, and requests the OS 210 to enter and load the library B (step S116).

Upon receiving the request, the OS 210 enters the library B in the ECU management table 192 (step S120). To perform this, the processor 100 follows the same procedure as that for the entry of the program A described previously with reference to FIG. 11. More specifically, the OS 210 selects from the shared key table 162 the ECU ID in which to enter the library B, then enters the distribution key and the distribution key verifier of the library B in the selected ECU ID, and issues a distribution key entry instruction, using the selected ECU ID and the distribution key (EP(Kp)(KxB)) of the library B as parameters. The ECU management unit 190 then selects a free entry in the ECU management table 192, and based on the distribution key entry instruction, enters the library B in the free entry of the ECU management table 192. That is, the ECU management unit 190 enters the distribution key verifier and the like of the library B in the ECU management table 192.

The OS 210 then performs program loading of the library B, while at the same time performs relocation associated with the load address. After enabling the library B for readout, the OS 210 sends to the program A an entry completion notice indicating completion of entry of the library B, after which control is transferred to the program A (step S122). Upon receipt of the entry completion notice, acquires from the OS 210 the ECU ID of the library B being the callee.

Following this, the program A sets the address area of the shared memory area and the encryption key in the data encryption attribute register 122 (step S130), then sets in the callee designation register 124 the ECU ID and distribution key verifier of the library B stored in the shared key table 162 of the BIU 160 (step S134), and issues an ECU call instruction (step S140). The processor 100 then executes the ECU call instruction.

Figure 12:
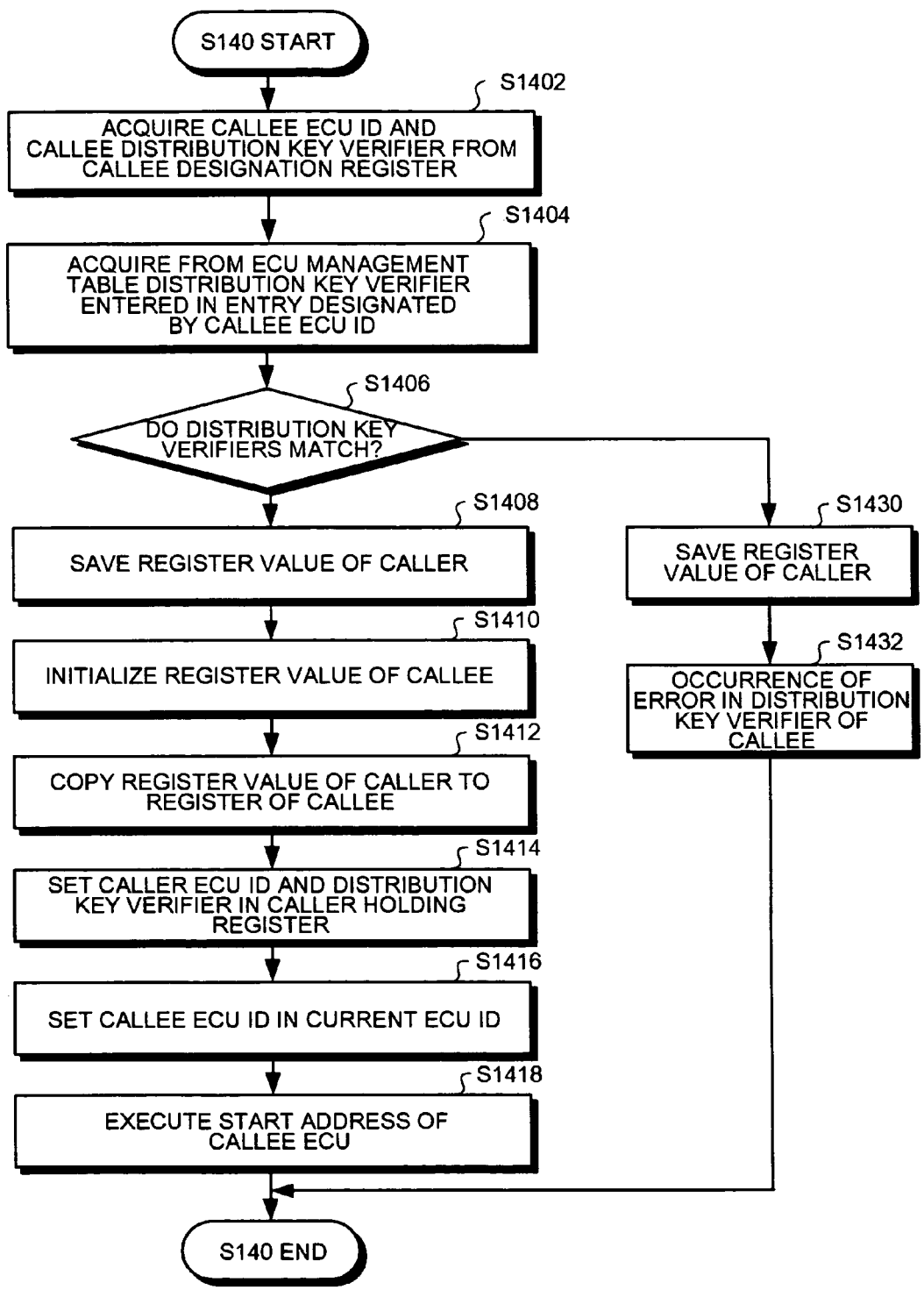
FIG. 12 is a flowchart of the procedure for executing a call instruction by the processor, at a step S140 shown in FIG. 10.

FIG. 12 is a flowchart of the procedure for executing the call instruction by the processor 100. The processor 100 first acquires a callee ECU ID 1241 and a callee distribution verifier 1242 from the callee designation register 124 (step S1402).

When a call instruction is issued from the program A, there are set in the callee designation register 124 the ECU ID and distribution key verifier of the library B acquired from the shared key table 162.

The processor 100 then acquires the distribution key verifier stored in the ECU management table 192 in correspondence to the callee ECU ID acquired from the callee designation register 124 (step S1404). This is followed by a comparison between the callee key verifier 1242 acquired from the callee designation register 124 and the distribution key verifier stored in the ECU management table 192 (step S1406).

When the both distribution key verifiers match (step S1406, Yes), the switching authorization decision unit 125 authorizes switching from the program A to the program B, and the procedure proceeds to the execution of the library B being the callee.

To begin with, the secure context switching unit 180 saves to the context buffer unit 184 register values of the program A that is the caller (step S1408). More specifically, the secure context switching unit 180 saves to the context buffer unit 184 those register values set in the general register 121, the data encryption attribute register 122, and the caller holding register 123. Thereafter, each register is used by the library B.

This is followed by initialization of the callee designation register 124 (step S1410). Of the register values of the program A held in the context buffer unit 184, register values except those set in the data encryption attribute registers 1224 to 1226 for local variables are copied to the register of the library B being the callee (step S1412).

Alternatively, the processor core 120 may include two register sets. In this instance, the use of two register sets increases efficiency in the processing. Thus, the registers values need only to be exchanged between the library B and the program A, and the number of register sets and the setting in the register sets are not limited specifically to those employed in this embodiment.

The ECU ID and distribution key verifier of the program A, which is the caller, are then set in the caller holding register 123 (step S1414), the value of the library B, which is the callee, is set in the callee designation register 124 (step S1416), and the start address of the callee ECU is executed (step S1418), with which the call instruction execution processing is concluded.

In step S1406, if the callee distribution key verifier 1242 acquired from the callee designation register 124 does not match the distribution key verifier stored in the ECU management table 192 (step S1406, No), the register values of the program A, which is the caller, are saved to the context buffer unit 184 (step S1430). This is followed by the occurrence of an error of callee distribution key verifier, and by transfer of control to the OS 210 (step S1432), with which the call instruction execution processing is concluded.

As described above, in the call instruction execution processing, the call of the library B by the library A is accompanied by authentication of the library B. This ensures preventing a malicious third party from erroneously executing programs other than the library B through utilization of processing by the OS 210.

An attack by a malicious third party through utilization of processing by the OS 210 is made, for example, in the case that although the program A requests entry of the library B, the OS 210 erroneously requests entry of a program different from the library B. This results in calling the program other than the library B.

Even when the library B has once been entered correctly and an assigned ECU ID has been posted, there is the possibility that before the program A calls the library B, the OS 210 suspends the execution of the program by an interruption and enters a different program in the ECU ID of the shared key table 162 posted to the program A. In this instance, too, a program different from the library B is called.

To prevent such an attack, it is necessary that the execution of the library B be permitted only when the callee is proved to be the library B by authentication. The authentication needs to be made when the program A calls the library B.

As described above, in the instruction execution processing according to this embodiment, the call of the library B involves not only mere designation of the callee ECU ID but also authentication that the callee is the library B. Only when the authentication is successful, the execution of the library B is started, and an attack by a malicious third party through utilization of processing by the OS 210 is prevented.

In the call instruction execution processing according to this embodiment, the callee program is authenticated by presetting the distribution key verifier of the callee program in the callee designation register 124, and, at the time of issuance of the call instruction, collating the distribution key verifier stored in the ECI management table 192 with the distribution key verifier preset in the callee designation register 124. The collation of the two distribution key verifiers can be implemented by extremely simple hardware. This permits reduction in the hardware scale and in the overhead for execution of the call instruction.

In this embodiment, the register values of the caller other than those for local variables are copied from the caller to the callee. In other words, the parameters for calling are not stored in an external memory, but instead they are passed from the caller to the callee. This allows reduction of processing overhead for the I/O operation of the external memory and encryption. Besides, it is possible to exclude the possibility of replacing parameters in the external memory, i.e. what is called a replay attack.

Parameters too large in size to be kept in the general register 121 can be stored in shared memory areas having their encryption attributes specified by ES registers 1221 to 1223 of the data encryption attribute register 122. This permits passing of large parameters. A cipher key for parameter passing between shared memories is directly transferred, as a value set in the data encryption attribute register, from the caller to the callee, by which parameter passing can be achieved with ease.

It is desirable that information desired not to be disclosed in the callee library be held in those local memory areas of the caller whose encryption attributes are specified by EL registers 1224 to 1226. The reason for this is that the value of the EL registers 1224 to 1226 is not copied to the callee and can be concealed from the callee.

Figure 13:
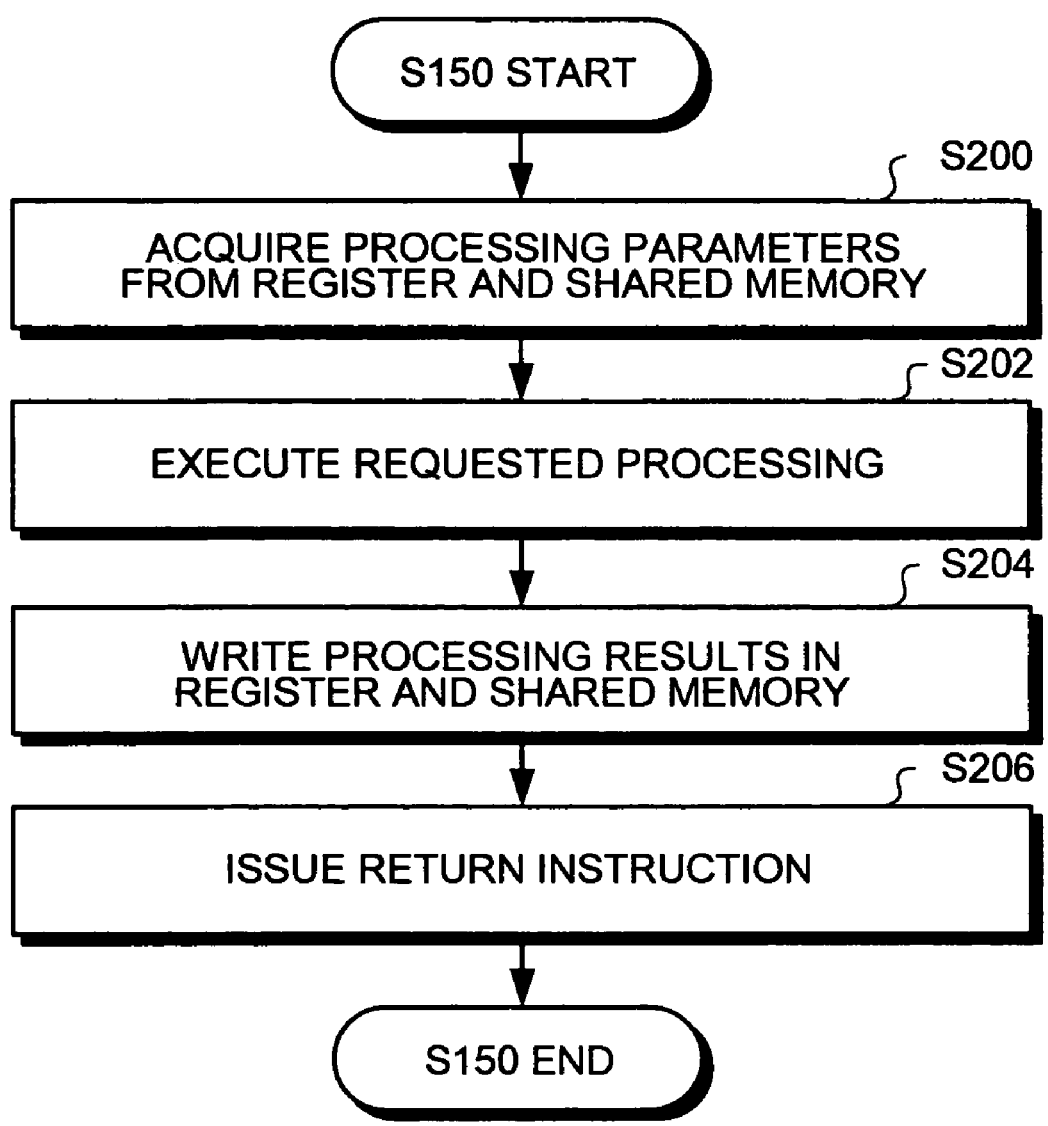
FIG. 13 is a flowchart of the procedure associated with the library B, when the library B is successfully authenticated, at the step S140 shown in FIG. 10.

Turning back again to FIG. 10, when the library B is proved to be valid in step S140, the execution of the library B is started. FIG. 13 is a flowchart of the procedure associated with the library B in this case.

The procedure begins with acquisition of processing parameters from each register and the shared memory (step S200), followed by execution of the processing requested by the program A (step S202), then by writing the processing results in a predetermined register and the shared memory (step S204), and by issuance of a return instruction (step S206). This is the complete processing associated with the library B. In such a processing, the callee library starts the execution at a predetermined start address each time, and no context is inherited from the previous operation.

Turning back again to FIG. 10, upon completion of the execution in the library B, an instruction for return to the program A is issued, and the result of processing is sent from the library B to the program A (step S160). The program as a return target is preset in the caller holding register 123. The register value of the caller holding register 123 can be read out by the library B, but rewriting the value of the caller holding register 123 is inhibited.

The library B performs, for the distribution key verifier of the distribution key of the caller program A, the same processing as that for authentication of the distribution key verifier of the callee library B as described previously with reference to FIG. 12. When the authentication of the program A is successful, processing for returning to the program A is continued.

If the authentication of the program A is unsuccessful, then the return processing is discontinued, and a system call for end is issued to the OS 210, and the processing is discontinued.

Figure 14:
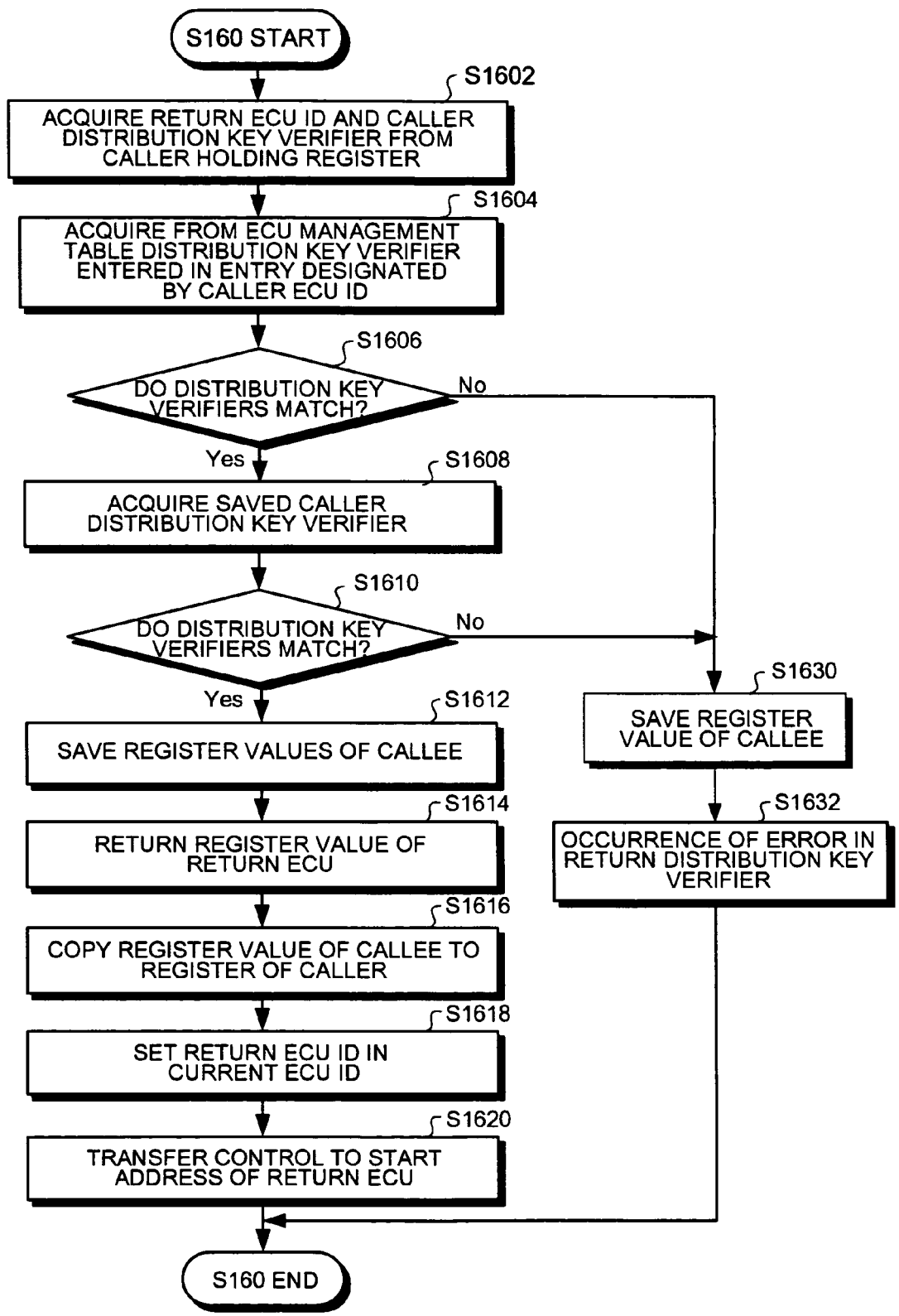
FIG. 14 is a flowchart of the procedure performed by the processor, at the step S160 shown in FIG. 10.

A description will be given, with reference to FIG. 14, of the processing that is performed by the processor 100 in the above situation. In the first place, the processor 100 acquires the caller ECU ID 1231 and the caller distribution key verifier 1232 from the caller holding register 123 of the ECU having issued the return instruction (step S1602). The processor 100 then acquires the distribution key verifier stored in the entry designated by the caller ECU ID of the ECU management table 192 (step S1604), thereafter making a comparison between the caller distribution key verifier 1232 acquired from the caller holding register 123 and the distribution key verifier entered in the ECU management table 192 (step S1606).

When the both distribution key verifiers match (step S1606, Yes), the processor acquires the distribution key verifier of the callee register from the register information held in the context buffer unit 184 (step S1608).

Following this, the processor 100 compares the distribution key verifier corresponding to the ECU under execution so far with the callee distribution key verifier acquired from the context buffer unit 184 (step S1610).

When a match is found between the distribution key verifier corresponding to the ECU under execution and the distribution key verifier acquired from the context of the program being a return target, that is, when the authentication of the library B is successful (step S1610, Yes), the processor 100 proceeds to a switching procedure described later on.

In the switching procedure, the secure context switching unit 180 saves the register values associated with the callee library so far under execution to the context buffer unit 184 (step S1612). More specifically, register values in the general register 121, the data encryption attribute register 122 and the callee designation register 124 are saved. Thereafter, the registers are used by the program A being a return target.

The register values of the ECU as a return target held in the context buffer unit 184 are then returned (step S1614), and of the register values of the callee library B held in the context buffer unit 184, respective register values, except the register values R2 to R15 in the general register and the register values in the data encryption attribute registers 1224 to 1226 for local variables, are copied to the register of the callee library B. As described above, in the case of return, only those of the register values in the general register 121, which are R0 and R1, are copied with a view to avoiding unnecessary disruption of the executing environment of the caller program A.

Thereafter, the ECU ID of the program A, which is a return target, is set in the current ECU ID holding unit 126 (step S1618), then control is transferred from the context buffer unit 184 to the returned PC, and the execution of the program A is resumed step S1620), with which the switching procedure concludes.

On the other hand, when no match is found in step S1606 between the caller distribution key verifier 1232 acquired from the caller holding register 123 and the distribution key verifier entered in the ECU management table 192 (step S1606, No), and when no match is found in step S1610 between the distribution key verifier of the ECU under execution until then and the distribution key verifier acquired from the context buffer unit 184 (step S1610, No), the register values of the callee library B are saved to the context buffer unit 184 (step S1630). An error then occurs in the return callee distribution key verifier (step S1632). This processing is the same as that which is performed when the callee distribution key verifier and the distribution key verifier entered in the ECU management table 192 do not match in processing responding to the call instruction.

As described above, only when the authentication of the distribution key verifier of the library B is successful, the program A receives the processing result from the library B. Therefore, it is possible to exclude the possibility of the program A receiving processing result form a program other than the library B that the program A originally intended as the callee.

The procedure of steps S132 to S160 by the program A is completed by one round of operations, but such a procedure may also be executed several times as a loop procedure.

The exemplary embodiments of the present invention have been described so far, but various alternations and modifications may be added to the embodiments.

While this embodiment has been described as being applied to the process for the program A to call the library B, as a modification, a similar authentication process is performed as well. For example, a process for a nested call, that is, where the library B calls a library C, can be performed.

The library B sets the ECU ID and a distribution key verifier of the callee library C in the callee register, and issues a call instruction. In the execution environment of the library B the caller register values are those of the program A. Accordingly, the caller register values of the library B are saved to the context buffer unit 184, together with other register values. In the execution environment of the library C the ECU ID and a distribution key verifier of the library B are set in the caller register. Upon issuance of an instruction for return from the library C, the register values of the library B are returned from the context buffer unit 184 and the caller register values also become those of the program A.

In this way, on issuance of the return instruction by the library B, the caller program A returns. This procedure enables nesting.

As described above, the registers for holding the ECU ID and distribution key verifier of the caller and the registers for holding the ECU ID and distribution key verifier of the callee are respectively provided independently, and at the time of switching from the caller to the callee, the caller ECU ID and distribution key verifier are both saved to the context buffer unit 184. Hence, the information of the caller can be secured. At the time of returning from the callee to the caller, the register values of the caller can also be returned. Accordingly, in such a multiple access according to the modification, data can be passed safely.

The second information holding unit of the microprocessor according to the present invention is impossible of penetration by third parties. Thus the information held in the second information holding unit is not tampered with. Accordingly, even if the information held in the first information holding unit is altered, the information in the second holding unit is not altered; therefore, the presence of alteration can be determined by comparing the pieces of information held in the two holding units. That is, the microprocessor according to the present invention makes a comparison between the authentication information held in the first holding unit and the authentication in the second holding unit upon issuance of instruction for switching to a second process, and only when the both pieces of information match, the microprocessor authorizes switching to the second process. This ensures preventing a malicious third party from penetration through the OS.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microprocessor executing a program including a plurality of processes, the microprocessor comprising:
a first information acquiring unit which acquires, from outside the microprocessor, second process identification information for identifying a second process to be executed by a first process and first authentication information for authenticating the second process;
a first information holding unit which holds the second process identification information, the first authentication information and a program key so that the second process identification information, the first authentication information and the program key are associated with each other;
a second information acquiring unit which acquires the second process identification information from the first information holding unit, and which acquires the first authentication information as second authentication information for authenticating the second process, which is associated with the program key or is calculated by using the program key, from the first information holding unit, when the first process is executed;
a second information holding unit which denies access from outside the microprocessor, and holds the second process identification information and the second authentication information so that the second process identification information and the second authentication information are associated with each other; and
a switching authorization unit which compares, upon issuance of an instruction for switching from the first process to the second process, the first authentication information held on the first information holding unit at the time when the instruction is issued with the second authentication information, and allows, when the first authentication information and the second authentication information match, switching from the first process to the second process.

2. The microprocessor according to claim 1, wherein the second process is a process encrypted with a shared key,
the first authentication information includes a distribution key obtained by encrypting the shared key with a public key,
the microprocessor further comprising:
a process decryption unit which, when the switching authorization unit allows switching from the first process to the second process, decrypts the second process with the shared key; and
an execution unit which executes the decrypted second process.

3. The microprocessor according to claim 2, further comprising a key decryption unit which obtains the shared key by decrypting the distribution key with a secret key held in the microprocessor.

4. The microprocessor according to claim 2, further comprising a verifier generation unit which generates a verifier of the distribution key, wherein
the first information holding unit includes the verifier in the first authentication information, and
the switching authorization unit compares, upon issuance of the instruction for switching from the first process to the second process, the verifier included in the first authentication information with a verifier included in the second authentication information, and allows, when the verifiers match, switching from the first process to the second process.

5. The microprocessor according to claim 1, further comprising:
a first register reserved by the first process; and
a register setting unit which, upon issuance of the instruction for switching from the first process to the second process, sets in the first register the second process identification information and the first authentication information which are held in the first information holding unit, wherein
the switching authorization unit compares the first authentication information set in the first register with the second authentication information held in the second information holding unit.

6. The microprocessor according to claim 5, wherein the first register includes
a second-process specific register which holds the second process identification information and the first authentication information; and
a general register which holds information associated with execution of the first process, wherein
the register setting unit sets the second process identification information and the first authentication information in the second-process specific register, and
the switching authorization unit compares the first authentication information held in the second-process specific register with the second authentication information held in the second information holding unit.

7. The microprocessor according to claim 6, wherein the second information holding unit further holds first process identification information for identifying the first process and third authentication information for authenticating the first process so that the first process identification information and the third authentication information are associated with each other,
the first register further includes a first-process specific register which holds the first process identification information and which holds the third authentication information as fourth authentication information,
the microprocessor further comprises:
a second register reserved by the second process; and
a copy unit which, when the switching authorization unit allows switching from the first process to the second process, copies the fourth authentication information held in the first process-specific register to the second register, wherein
the switching authorization unit compares the fourth authentication information copied by the copy unit with the third authentication information held in the second information holding unit, and allows, when the third authentication information and the fourth authentication information match, switching from the second process to the first process.

8. The microprocessor according to claim 5, further comprising:
a save unit which saves information held in the first register reserved by the first process during execution of the second process; and
a register buffer which holds the information saved by the save unit.

9. The microprocessor according to claim 8, further comprising:
a second register reserved by the second process; and
a copy unit which copies to the second register the information saved to the register buffer.

10. A method of executing a program including a plurality of processes, the method comprising:
    acquiring, from outside the microprocessor, second process identification information for identifying a second process to be executed by a first process and first authentication information for authenticating the second process;
    storing, in a first information holding unit, the second process identification Information, the first authentication information and a program key so that the second process identification information, the first authentication information and the program key are associated with each other;
    acquiring, from the first information holding unit, the first authentication information as second authentication information for authenticating the second process, which is associated with the program key or is calculated by using the program key and the second process identification information, when the first process is executed;
    storing, in a second information holding unit which denies access from outside the microprocessor, the second process identification information and the second authentication information so that the second process identification information and the second authentication information are associated with each other; and
    comparing, upon issuance of an instruction for switching from the first process to the second process, the first authentication information held on the first information holding unit at the time when the instruction is issued with the second authentication information; and
    allowing, when the first authentication information and the second authentication information match, switching from the first process to the second process.

11. The method according to claim 10, wherein the second process is a process encrypted with a shared key,
    the first authentication information includes a distribution key obtained by encrypting the shared key with a public key,
    the method further comprising:
    decrypting, when the switching authorization unit allows switching from the first process to the second process, the second process with the shared key; and
    executing the decrypted second process.

12. The method according to claim 11, further comprising obtaining the shared key by decrypting the distribution key with a secret key held in the microprocessor.

13. The method according to claim 11, further comprising generating a verifier of the distribution key, wherein
    the first authentication information includes the verifier,
    the comparing includes comparing, upon issuance of the instruction for switching from the first process to the second process, the verifier included in the first authentication information with a verifier included in the second authentication information, and
    the allowing includes allowing, when the verifiers match, switching from the first process to the second process.

14. The method according to claim 10, further comprising setting, upon issuance of the instruction for switching from the first process to the second process, the second process identification information and the first authentication information which are stored in the first information holding unit, in a first register reserved by the first process, wherein
    the comparing includes comparing the first authentication information set in the first register with the second authentication information stored in the second information holding unit.

15. The method according to claim 14, wherein the first register includes
    a second-process specific register which holds the second process identification information and the first authentication information; and
    a general register which holds information associated with execution of the first process, wherein
    the setting includes setting the second process identification information and the first authentication information in the second-process specific register, and
    the comparing includes comparing the first authentication information held in the second-process specific register with the second authentication information held in the second information holding unit.

16. The method according to claim 15, further comprising storing, in the second information holding unit, first process identification information for identifying the first process and third authentication information for authenticating the first process so that the first process identification information and the third authentication information are associated with each other,
    the first register further includes a first-process specific register which holds the first process identification information and which holds the third authentication information as fourth authentication information,
    the method further comprises:
    copying, when the switching authorization unit allows switching from the first process to the second process, the fourth authentication information held in the first process-specific register to a second register reserved by the second process, wherein
    the comparing includes comparing the fourth authentication information copied with the third authentication information held in the second information holding unit, and
    the allowing includes allowing, when the third authentication information and the fourth authentication information match, switching from the second process to the first process.

17. The method according to claim 14, further comprising saving information held in the first register reserved by the first process during execution of the second process, wherein the information saved is held in a register buffer.

18. The method according to claim 17, further comprising copying to a second register reserved by the second process the information saved to the register buffer.

19. A microprocessor executing a program including a plurality of processes, the microprocessor comprising:
    first information acquiring means for acquiring, from outside the microprocessor, second process identification information for identifying a second process to be executed by a first process and first authentication information for authenticating the second process;
    first information holding means for holding the second process identification Information, the first authentication information and a program key so that the second process identification information, the first authentication information and the program key are associated with each other;
    second information acquiring means for acquiring the second process identification information from the first information holding means, and for acquiring the first authentication information as second authentication information for authenticating the second process, which is associated with the program key or is calculated by using the program key, from the first information holding means, when the first process is executed;

second information holding means, which denies access from outside the microprocessor, for holding the second process identification information and the second authentication information so that the second process identification information and the second authentication information are associated with each other; and switching authorization means for comparing, upon issuance of an instruction for switching from the first process to the second process, the first authentication information held on the first information holding means at the time when the instruction is issued with the second authentication information, and for allowing, when the first authentication information and the second authentication information match, switching from the first process to the second process.

* * * * *